United States Patent [19]

Ystebo

[11] 4,232,874
[45] Nov. 11, 1980

[54] TANK MOUNTED ON BACK OF FOUR-WHEEL DRIVE TRACTOR

[76] Inventor: Stuart Ystebo, 2421 - 16th Ave. South, Moorhead, Minn. 56560

[21] Appl. No.: 961,736

[22] Filed: Nov. 17, 1978

[51] Int. Cl.³ .......................... B65D 11/22; B60P 3/22
[52] U.S. Cl. .................................... 280/5 A; 220/855
[58] Field of Search ............. 280/5 R, 5 H, 5 G, 5 A, 280/5 D, 759; 220/22, 71, 72, 85 B, 85 S, 85 VR, 85 VS, 1 V, 86 R, 4 R; 222/155, 195, 564, 318; 239/172

[56] References Cited

U.S. PATENT DOCUMENTS

| 2,200,764 | 5/1940 | Baker | 280/5 A |
| 2,208,621 | 7/1940 | Ball | 280/5 R |
| 2,237,310 | 4/1941 | Norbom | 280/5 G |
| 3,536,228 | 10/1970 | Ruggles | 220/71 |
| 3,662,918 | 5/1972 | Crawford | 220/5 A |
| 4,149,734 | 4/1979 | Sylvester | 280/5 H |

Primary Examiner—John J. Love
Assistant Examiner—Randall A. Schrecengost
Attorney, Agent, or Firm—Burd, Bartz & Gutenkauf

[57] ABSTRACT

A tank attached with a mounting bracket to the rear drive unit of a four-wheel drive tractor. The tank has a one-piece plastic body providing a chamber for accommodating a liquid. The top of the body is covered with a rearwardly and downwardly sloping plastic top wall to enhance the visibility of the tractor operator. A plurality of ribs on the bottom wall and top wall project into the chamber on opposite sides of upright baffle plates. A liquid return structure located in the chamber and mounted on the back wall of the body discharges return liquid to opposite end sections of the chamber.

48 Claims, 9 Drawing Figures

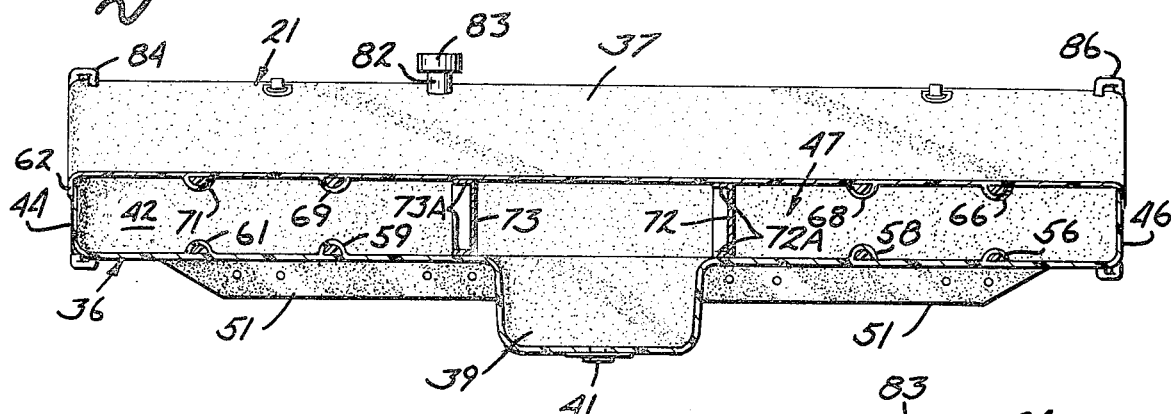
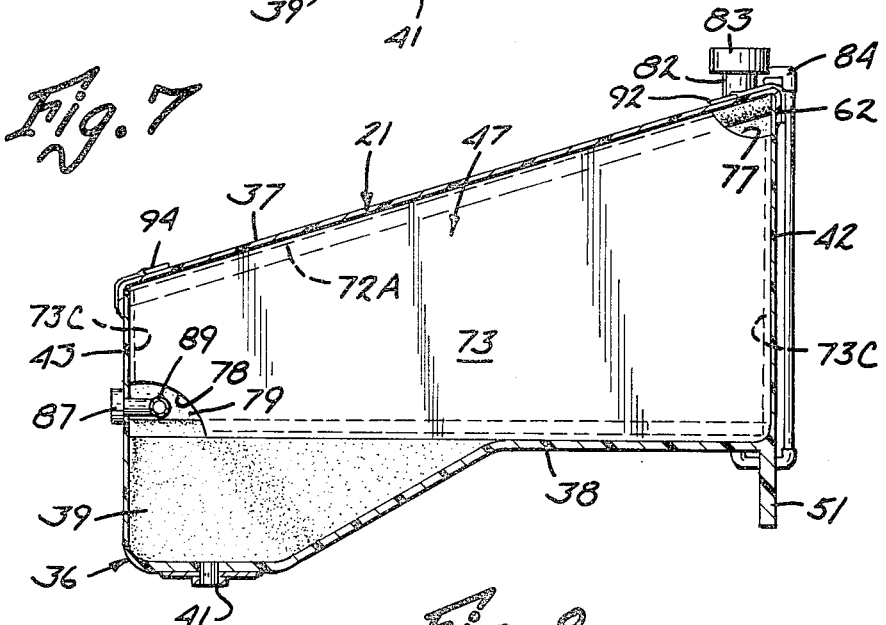
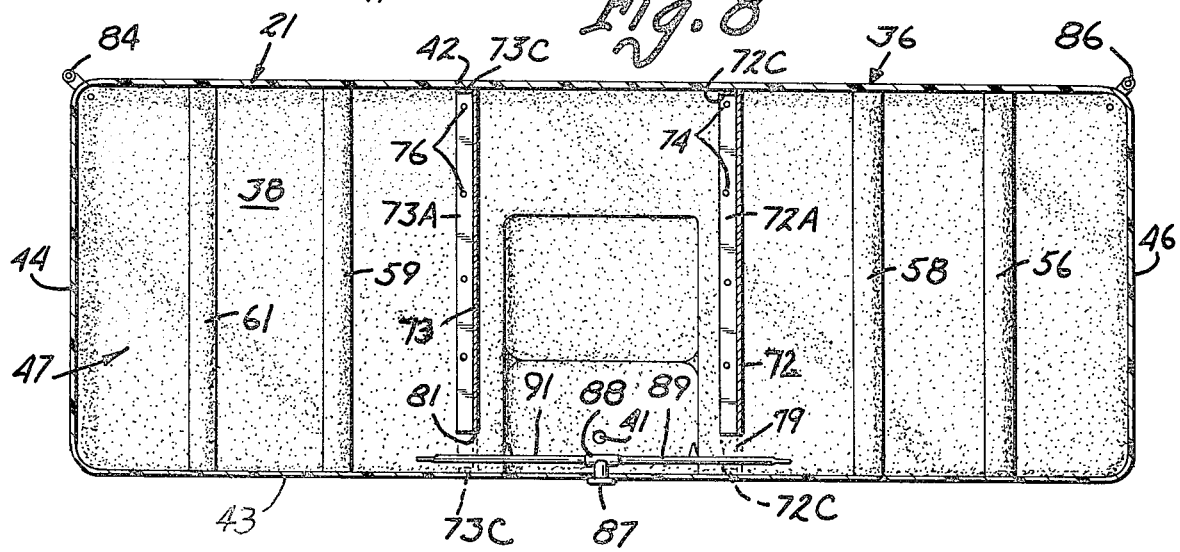

TANK MOUNTED ON BACK OF FOUR-WHEEL DRIVE TRACTOR

SUMMARY OF INVENTION

The invention is broadly directed to a container for storing liquid. The container is a tank adapted to be mounted on an agricultural tractor for carrying liquids, as herbicides, insecticides, and fertilizers. A mounting bracket is used to attach the tank to the tractor in a manner locating the tank above the tractor drive wheels. The tank is a lightweight, rustproof, and strong walled structure made of plastic material reinforced with fibers, as glass fibers. The plastic material is inert to the liquids carried in the tank and to the elements of natural environment. Prior metal tanks are relatively heavy and subject to rusting.

The tank has a one-piece plastic body defining the liquid accommodating chamber. The top of the body is covered with a top wall. The top wall has a generally flat upper side that slopes downwardly and rearwardly to enhance the visibility of the tractor operator over the tank. The body has a bottom wall joined to transverse front and rear walls and end walls. The bottom wall has a central downwardly directed well and is reinforced with a plurality of ribs. Each rib projects up into the tank chamber and extends from the front wall to the rear wall. The top wall has a plurality of inwardly directed ribs projected down into the tank chamber. Each rib on the top and bottom walls has a linear bead of foamed plastic covered with an inner layer of plastic material. Front and rear lateral flanges are joined to the front and rear of the bottom wall. The flanges are used to connect the tank to the mounting bracket carried by the tractor.

The tank chamber is divided into end and center sections with baffle plates. The baffle plates reinforce the top wall and control lateral surging of the liquid in the tank chamber. Each baffle plate has an opening allowing liquid to flow to the well in the bottom wall.

A liquid return and agitation means is located in the tank chamber. A tubular member is mounted on the back wall to receive liquid under pressure from an outside supply and discharge the liquid into end sections of the tank chamber. Sight gauges are provided on each front corner of the tank to provide a visual indication of the level of liquid in the tank chamber. Each sight gauge has an upright transparent tube in liquid communication with the top and bottom of the tank chamber.

IN THE DRAWINGS

FIG. 6 is a sectional view taken along the line 6—6 of FIG. 3;

FIG. 7 is an enlarged sectional view taken along the line 7—7 of FIG. 3;

FIG. 8 is a sectional view taken along the line 8—8 of FIG. 5; and

DESCRIPTION OF PREFERRED EMBODIMENT

Figure 1:
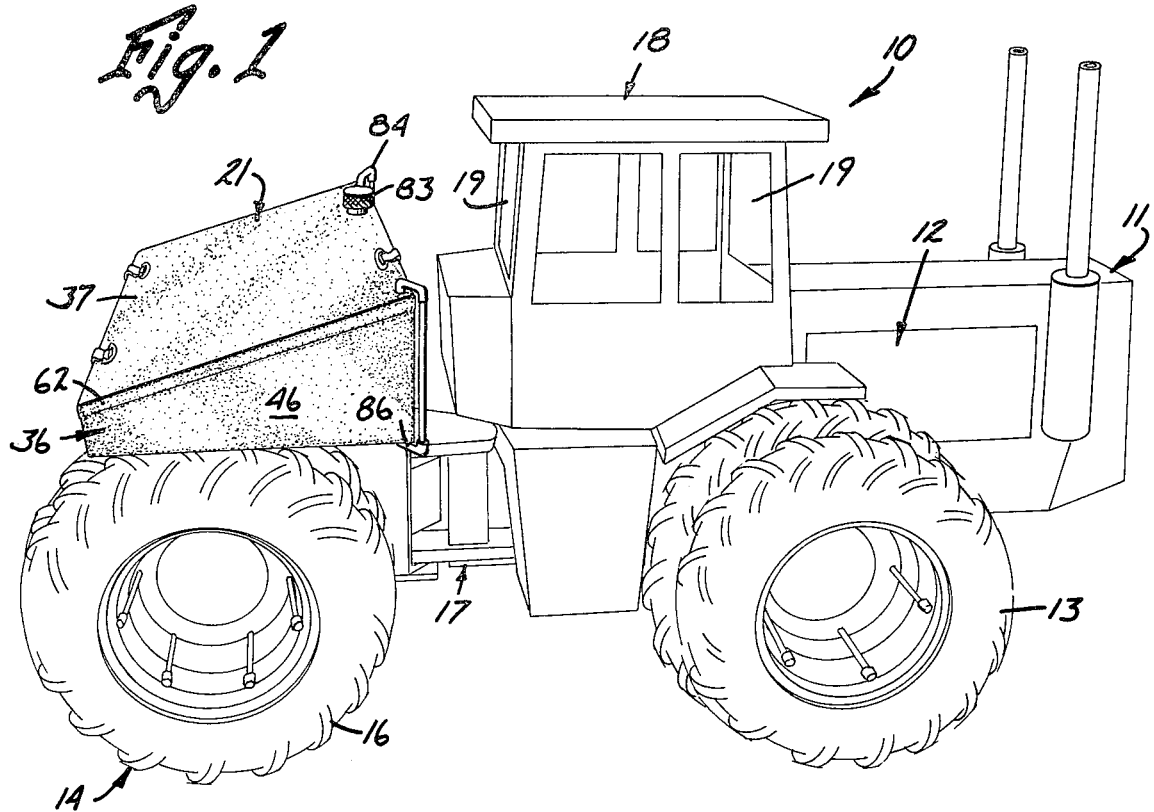
FIG. 1 is a perspective view of a four-wheel drive tractor carrying the tank of the invention.
Figure 2:
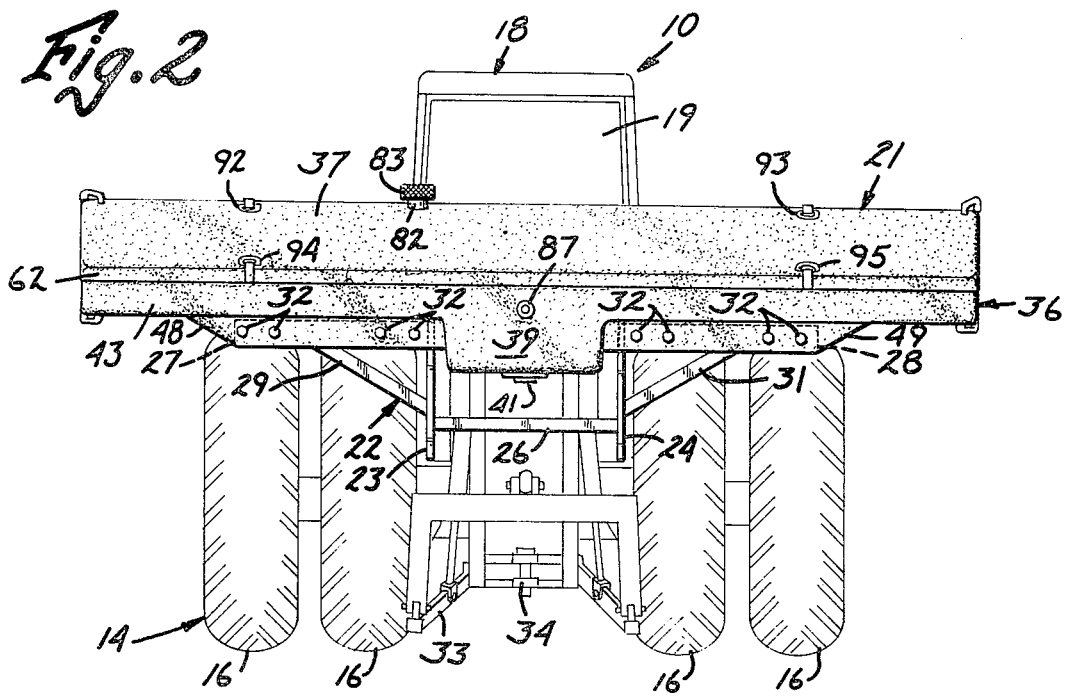
FIG. 2 is a rear elevational view of the tractor and tank shown in FIG. 1.

Referring to FIGS. 1 and 2, there is shown a four-wheel drive articulated tractor indicated generally at 10. Tractor 10 is a conventional large agricultural power vehicle having a front or power unit 11 equipped with an internal combustion engine or motor 12. Motor 12 is drivably connected to front drive wheels 13 and transmits power to a rear drive unit 14 having rear drive wheels 16. Wheels 13 and 16 are shown as dual wheels located on opposite sides of drive units 11 and 14. Drive units 11 and 14 are pivotally connected together with an upright pivot joint 17 which allows the operator to steer the vehicle.

Front drive unit 11 has an operator's cab 18 located between the front drive wheels 13 and pivot joint 17. Cab 18 has side and front windows 19 enabling the operator to visually observe the ground immediately in front of the tractor and the equipment and work being done by the equipment attached to the tractor draw bar or three-point hitch.

A tank indicated generally at 21 is mounted on rear drive unit 14 directly above rear drive wheels 16. Tank 21 has a large capacity which can range from 500 to 1050 gallons of liquid, such as insecticides, herbicides, and fertilizers. Tank 21 can have other sizes to change its liquid carrying capacity. The liquid is delivered to an implement (not shown) operable to dispense, incorporate, or spray the liquid to or into the soil. The weight of the liquid carried by tank 21 is transmitted directly downwardly to the ground via drive unit 14 and rear wheels 16. Tractor 10 can be provided with dual or tri-wheels to minimize compaction and packing of the ground by the tractor wheels.

A mounting bracket indicated generally at 22 secures tank 21 to the transmission housing structure of rear unit 14. Mounting bracket 22 located between rear drive wheels 16 has a pair of upright side plates 23 and 24 connected to a cross member 26. A first mounting plate 27 is secured to the top of side plate 23 and extends laterally outwardly therefrom. A diagonal brace 29 connects the mid-sections of plates 23 and 27. A second mounting plate 28 is attached to side plate 24 and extends laterally outwardly therefrom. A diagonal brace 31 is joined to the mid-sections of plates 24 and 28. Mounting plates 27 and 28 are attached with a plurality of nut and bolt assemblies 32 to portions 48 and 49 of tank 21. Mounting bracket 22 has a front mounting plate (not shown) attached to a second or front portion 51 of tank 21. Mounting bracket 22 locates tank 21 above the wheels and above three-point hitch 33 and draw bar 34. Tank 21 does not interfere with the operation or use of three-point hitch 33 or draw bar 34. The weight of tank 21 and the liquid located in tank 21 is in general transverse vertical alignment with the transverse axles of drive wheels 16.

Tank 21 has a lower section or body indicated generally at 36 carrying a downwardly and rearwardly inclined top wall 37. Body 36 has a bottom wall 38 having a downwardly directed well or sump section 39. As shown in FIG. 7, well 39 is located in the center rear portion of wall 38. The lowest portion of well 39 has an outlet connector 41 adapted to accommodate a line or hose (not shown) used to carry the liquid stored in tank 21 to a desired location, such as a dispensing implement or a spraying unit. An upwardly directed transverse front wall 41 is joined to the transverse forward end of bottom wall 38. An upwardly directed transverse rear wall 43 is joined to the rear section of bottom wall 38. Wall 41 has more than twice the height of wall 43. Body 36 is completed with upright side walls 44 and 46 joined to the end of the bottom wall 38 and front and rear walls 41 and 43. Body 36 is a one-piece plastic structure providing a chamber or storage space 47 for the liquid.

The dimensions of an example tank are as follows. Tank 21 has a longitudinal dimension or width of 152 cm, 60 inches; transverse dimension or length of 335 cm, 132 inches; front wall 42 height of 68.5 cm, 27 inches; and rear wall 43 height of 30.4 cm, 12 inches. The height of rear wall 43 can vary from 11.3 cm, 4.5 inches to 30.4 cm, 12 inches. The height of front wall 42 can be 76.2 cm, 30 inches. These dimensions can vary with different sizes of tanks.

Figure 4:
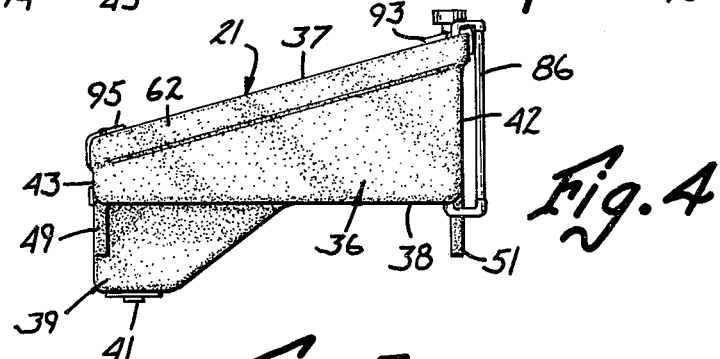
FIG. 4 is a side elevational view of the right side of the tank of FIG. 3.
Figure 5:
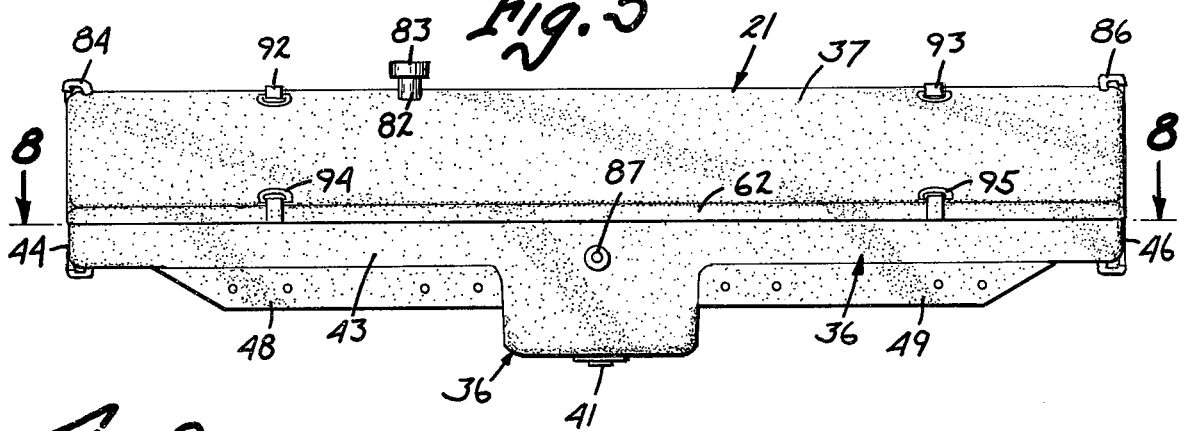
FIG. 5 is a rear elevational view of the tank.

Referring to FIG. 5, a first downward lateral flange 48 extends outwardly from well 39 toward side wall 44. A second downward lateral flange 49 extends outwardly from well 39 toward end wall 46. Lateral flanges 48 and 49, as shown in FIG. 4, are in general vertical alignment with rear wall 43. Flanges 48 and 49 are positioned against mounting plates 27 and 28 of the mounting bracket 22 and secured thereto with nut and bolt assemblies 32. Flanges 48 and 49 have suitable holes to accommodate the nut and bolt assemblies 32. Referring to FIGS. 6 and 7, a transverse front flange 51 extends downwardly from the forward edge of bottom wall 38. Flange 51 is in general vertical alignment with front wall 42. A forward transverse mounting plate (not shown) of mounting bracket 22 is located adjacent front flange 51 and is attached thereto with suitable nut and bolts assemblies.

Figure 9:
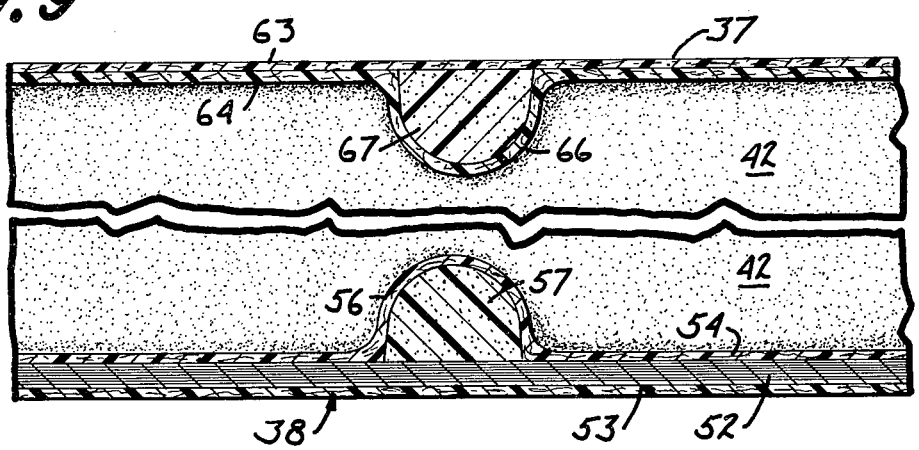
FIG. 9 is a foreshortened enlarged sectional view taken along the line 9—9 of FIG. 3.

Referring to FIG. 9, bottom wall 38 is a laminated plastic structure having a core or intermediate layer 52 joined to an outer layer 53 and an inner layer 54. A longitudinal rib 56 is formed by a foamed plastic bead 57 and covered with the inner layer 54. The layers 52, 53, and 54 are fibrous reinforced plastic. Plastic bead 57 is a polyurethane foam material. The fibrous material can be chopped glass filament incorporated in thermo plastic materials. Preferably, the glass filaments are chopped into about ¼ inch lengths. Other lengths of glass filaments can be used. The plastic materials can include styrenic materials, as glass reinforced ABS, glass reinforced SAN, polyolefins, as polyethylene and polypropylene, and polysolfone, and polycarbonate. Other types of plastic materials reinforced with fibrous materials, including glass filaments, silastic fibers, carbon fibers, inorganic fibers, and synthetic organic fibers, can be used to form plastic bottom wall 38. Front wall 42, rear wall 43, and side walls 44 and 46 are the same construction as bottom wall 38, as shown in FIG. 9.

Rib 56, as shown in FIG. 8, extends from front wall 42 to rear wall 43 across bottom wall 38 generally parallel to end wall 46. Additional ribs 58, 59, and 61 are incorporated into bottom wall 38. Ribs 56 and 58 are located in the right hand section of bottom wall 38. Ribs 59 and 61 are located in the left hand section of bottom wall 38, as shown in FIG. 8. All of the ribs 56, 58, 59, and 61 extend upwardly into chamber 47 from front wall 42 to rear wall 43 and have a foamed plastic bead similar to bead 57.

Top wall 37 has a downwardly directed outer peripheral flange 62 that fits over the top portions of the front and rear walls 42 and 43 and side walls 44 and 46. Flange 62 is secured to these walls with suitable bonding material, adhesive, or a layer of reinforced plastic.

Figure 3:
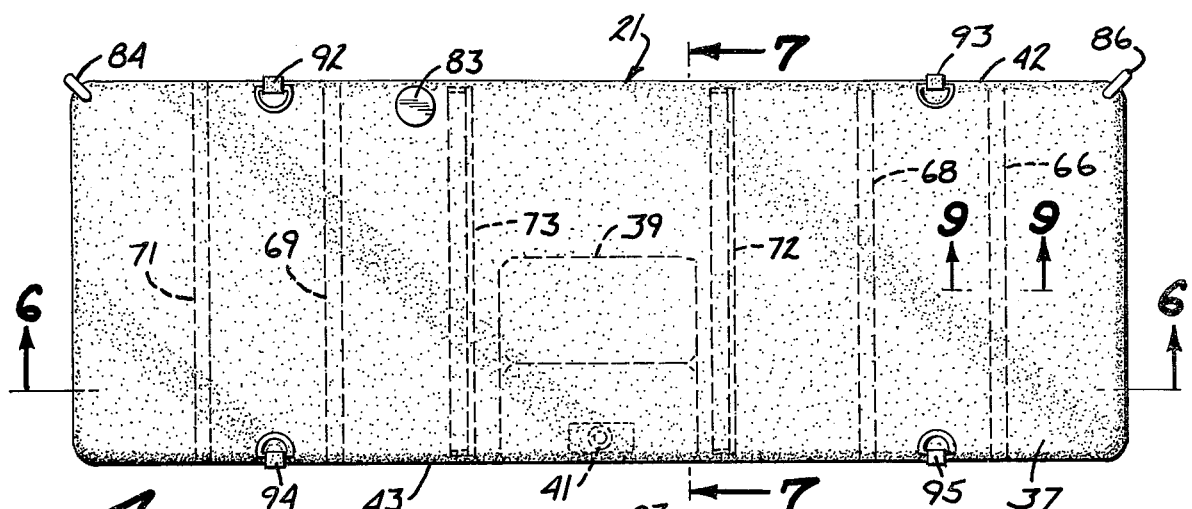
FIG. 3 is a top view of the tank.

Referring to FIG. 9, top wall 37 is a laminated structure having an outer plastic layer 63 and an inner plastic layer 64. An elongated rib 66 extends downwardly into chamber 47. Rib 66 is formed by an elongated bead 67 of foamed plastic covered by inner layer 64. The plastic material of layers 63 and 64 can be fibrous reinforced plastic, such as the plastic materials used in bottom wall 38. Referring to FIGS. 3 and 6, top wall 37 has additional elongated ribs 68, 69, and 71 extended down into chamber 47. Ribs 66 and 68 are on the right section of top wall 37 and, as viewed in FIG. 3, ribs 69 and 71 are in the left section of top wall 37. Ribs 66, 68, 69, and 71 extend from the full width of the tank from the front wall 42 to rear wall 43.

As shown in FIGS. 4, 6, 7, and 8, a pair of upright baffle plates 72 and 73 are located in chamber 47. Plates 72 and 73 are plastic members glassed and bolted to the top and bottom walls 37 and 38. Baffle plate 72 located adjacent the left side of the sump or well 39 extends from front wall 42 to rear wall 43. Baffle plate 72 has a lower flange or lip 72A accommodating fasteners 74 which attach baffle plate 72 to bottom wall 38. The upper edge of baffle plate 72 has a top flange 72A attached to top wall 37 with attaching top structures, as fasteners, or suitable bonding or adhesive materials. Baffle plate 72 also has end upright flanges 72C secured to the front and rear walls 42 and 43, respectively.

A second baffle plate 73 located adjacent the right side of well 39 extends from front wall 42 to rear wall 43. Baffle plate 73 has a bottom flange 73A connected with suitable fasteners 76 to bottom wall 38. The top edge of baffle plate 73 has a top flange 73A located in engagement with bottom of top wall 37 and secured thereto. The opposite ends of baffle plate 73 have flanges 73C attached to front and rear walls 42 and 43.

As shown in FIG. 7, baffle plate 73 has a first cut-out 77 in the upper top corner of the plate providing an air passage between the center and left section of tank chamber 47. Baffle plate 72 has a similar cut-out so that the air pressure in the tank is equalized. The lower left corner of baffle plate 73 has a second cut-out 78 forming a passage 79 providing for the flow or drainage of the liquid in the left portion of chamber 47 to the well or sump 39. Baffle plate 72 has a similar cut-out forming passage 81 which allows the liquid product to drain from the right side of chamber 47 to the well or sump 39. Baffle plates 72 and 73 in cooperation with inwardly directed ribs 56, 58, 59, and 61 on bottom wall 38 and ribs 66, 68, 69, and 71 on the top wall 37 reinforce the top and bottom walls 37 and 38, respectively, and dampen the lateral movement or surging of the liquid in the tank. The level of the liquid product in the tank chamber 47 remains substantially constant or even so that there is equal weight distribution on bottom wall 38.

Referring to FIGS. 5, 7, and 8, an upright inlet tube or pipe 82 is attached to top wall 37. Pipe 82 has a fill or inlet passage whereby the liquid can be loaded into tank chamber 47. A removable cap 83 closes the top of tube 82.

The level of the liquid in chamber 47 is visually observed with the use of sight gauges 84 and 86. As shown in FIGS. 6 and 7, a sight gauge 84 is located on the upper left corner of tank 21. Sight gauge 84, as shown in FIG. 7, comprises an upright transparent tube connected at its opposite end to U-shaped tubes. The U-shaped tubes are joined to and are in liquid communication with the top and bottom of tank chamber 47. Sight gauge 86 is mounted on the upper right corner of tank 21.

A liquid product return connection 87 is mounted in the center section of wall 43. Connection 87 is attached to a T-coupling 88 located in the inside of chamber 47. Outwardly directed or lateral tubular members or pipes 88 and 89 are attached to T-coupling 89. As shown in FIG. 8, pipe 89 extends through passage 79 of baffle plate 72 so as to carry return liquid to the right section of chamber 47. Pipe 91 extends through passage 81 in baffle plate 73 to return the liquid product to the left section of chamber 47. The pipes 89 and 91 have suitable holes so that the liquid is dispensed in the left and right sections, as well as the center section of chamber 47. The returning liquid mixes and agitates the liquid product in chamber 47.

Tank 21 is provided with ring structures 92 and 93 on the front side of top wall 37 and ring structures 94 and 95 on the bottom of the rear section of wall 37. The ring structures 92-95 are used with a lifting device, such as a crane, to facilitate the handling and the mounting of tank 21 on tractor 10. Suitable lines are attached to the ring structures 92-95 so that tank 21 can be lifted from the mount bracket 22 and moved to a storage location.

In use, the tank 21 is mounted with mounting bracket 22 on the tractor 10. Tank 21 is located above the axle for rear drive wheel 16. The top wall 47 slopes downwardly and rearwardly providing the operator of the tractor with a good rear visibility. Tank body 36 and top wall 37 are made of rust-proof, lightweight, fabric reinforced plastics which do not deteriorate with use. The tank is useable with liquids, such as agricultural herbicides, insecticides, fertilizers, and like agricultural liquid materials. The plastic of the tank walls does not react or deteriorate with these liquids and the chemicals therein. The liquid is withdrawn from tank chamber 47 through outlet connector 41 in the bottom of well 39. The liquid in tank chamber 47 is agitated and mixed by a return agitation structure having the return pipes 89 and 91 which direct the return liquid into the left, right, and center sections of chamber 47.

The level of the liquid product in the tank is visually observed through sight gauges 84 and 86. When the sight gauges 84 and 86 indicate a low level, the remaining liquid in tank chamber 47 is in sump or well 39.

The top and bottom walls 37 and 38, respectively, are reinforced with inwardly directed ribs that project into the tank chamber 47 so the tank can carry heavy fertilizer loads and withstand bouncing in rough terrain. The inwardly directed ribs have an internal structure or cores of a foamed material which facilitates the fabrication of the top and bottom walls 37 and 38 of the tank. Baffle plates 72 and 73 reinforce the center sections of the top and bottom walls 37 and 38, as well as the front and rear walls 42 and 43. Baffle plates 72 and 73 also inhibit the lateral surging and unequal loading of the liquid in tank chamber 47.

While there is shown and described the preferred embodiment of the liquid carrying tank of the invention, it is understood that changes in the tank structures, materials for making the tank, and the tank mounting structures can be made by those skilled in the art without departing from the invention. The invention is defined in the following claims.

The embodiments of the invention in which an exclusive property or privilege is claimed are defined as follows:

1. A tank mountable on a rear drive unit of a tractor with a mounting bracket, said drive unit having rear drive wheels comprising: a one-piece body of plastic material reinforced with fibers having a chamber for storing liquid, said body comprising a bottom wall having a front transverse portion, a rear transverse portion, and a plurality of first ribs projected upwardly into the chamber, each first rib extended from the front portion to the rear portion of the bottom wall, each first rib having a bead of foamed plastic covered with plastic material, a front wall joined to the front transverse portion, a rear wall joined to the rear transverse portion, said front wall having a height greater than the height of the rear wall, side walls joined to the bottom wall and front and rear walls, a top wall joined to the front wall, rear wall, and side walls to cover the top of the body and close the top of the chamber, said top wall being generally flat and sloping downward and rearward from the front wall toward the rear wall, said top wall being made of plastic material reinforced with fibers and having a plurality of laterally spaced second ribs projected downwardly into the chamber, each second rib extended from the front wall to the rear wall, each second rib having a bead of foamed plastic covered with plastic material, a plurality of upright baffle plates located in the chamber, each plate extended from the front wall to the rear wall and engageable with the bottom wall and top wall, means mounted on the top wall providing an inlet passage open to the chamber, said bottom wall and rear wall having central sections providing a downwardly directed well, second means mounted on the bottom wall providing an outlet passage in the lower portion of the well open to the chamber, and means mounted on the rear wall for receiving liquid and discharging liquid into the tank chamber, said means mounted on the rear wall including tubular means located in the chamber for carrying liquid toward the end walls and discharging liquid to the end sections of the chamber.

2. The tank of claim 1 wherein: the front wall has a height greater than two times the height of the rear wall.

3. The tank of claim 1 wherein: the top wall has a downwardly extended peripheral flange engageable with upper portions of the front wall, rear wall, and end walls of the body, and means securing the flange to said upper portions.

4. The tank of claim 3 wherein: the flange overlaps said upper portions of the front, rear, and end walls of the body.

5. The tank of claim 1 wherein: the bottom wall and rear wall having central sections providing a downwardly directed well, said second means providing an outlet passage being mounted on a lower portion of the well.

6. The tank of claim 1 including: means joined to the bottom wall adapted to be connected to the mounting bracket to support the tank on the rear drive unit of the tractor above the rear drive wheels, said means including first flange means located adjacent the rear transverse portion of the bottom wall in general vertical alignment with the rear wall, and second flange means located adjacent the front transverse portion of the bottom wall in general vertical alignment with the front wall mounted on the rear wall for receiving liquid and discharging liquid into the tank chamber.

7. The tank of claim 1 including: sight gauge means mounted on the bottom wall and top wall for monitoring the level of liquid in the tank chamber.

8. The tank of claim 7 wherein: the sight gauge means includes an upright tubular member.

9. The tank of claim 1 including: means joined to the bottom wall adapted to be connected to the mounting bracket to support the tank on the rear drive unit of the tractor above the rear drive wheels.

10. The tank of claim 9 wherein: the means joined to the bottom wall includes first flange means located adjacent the rear transverse portion of the bottom wall, and second flange means located adjacent the front transverse portion of the bottom wall.

11. The tank of claim 1 wherein: each baffle plate has an opening in a lower portion thereof, said tubular means having separate portions extended through the openings in the baffle plates.

12. The tank of claim 1 wherein: the bottom wall has a plastic core, a plastic outer layer, and a plastic inner layer, each first rib having a foam plastic bead located between the core and inner layer.

13. The tank of claim 1 wherein: the top wall has a plastic outer layer, and a plastic inner layer, each second rib having a foam plastic bead located between the inner and outer layers.

14. A tank having a chamber for storing liquid comprising: a body having a bottom wall, a front wall, a rear wall, and end walls providing a chamber for storing liquid, said bottom wall having a plurality of upwardly directed first ribs extended into the chamber, a top wall joined to the front wall, rear wall and end walls to cover the top of the body, said top wall sloping downward from the front wall toward the rear wall, said top wall having a plurality of downwardly directed second ribs extended into the chamber, first means providing an inlet passage open to the chamber, second means providing an outlet passage open to the chamber, and means mounted on the rear wall for receiving liquid and discharging liquid into the tank chamber, said means mounted on the rear wall including tubular means located in the chamber for carrying liquid toward the end walls and discharging liquid to the end sections of the chamber.

15. The tank of claim 14 wherein: the bottom wall and rear wall have central sections providing a downwardly directed well, said second means providing an outlet passage being mounted on a lower portion of the well.

16. The tank of claim 15 including: at least one baffle plate located in the chamber and extended from the front wall to the rear wall and engageable with the bottom wall and top wall, said baffle plate having an opening in the lower portion thereof for accommodating a portion of the tubular means.

17. The tank of claim 16 wherein: the baffle plate has an opening in the upper portion thereof.

18. The tank of claim 14 wherein: the body and top wall are made of plastic material having reinforcing fibers.

19. The tank of claim 18 wherein: the bottom wall has a plastic core, a plastic outer layer, and a plastic inner layer, each first rib having a foam plastic bead located between the core and inner layer.

20. The tank of claim 18 wherein: the top wall has a plastic outer layer, and a plastic inner layer, each second rib having a foam plastic bead located between the inner and outer layers.

21. The tank of claim 18 wherein: the first and second ribs each include a bead.

22. The tank of claim 21 wherein: the bead is a foamed plastic.

23. The tank of claim 14 wherein: the bottom wall has a downwardly directed well.

24. The tank of claim 14 including: at least one baffle plate located in the chamber and extended from the front wall to the rear wall and engageable with the bottom wall and top wall.

25. The tank of claim 24 wherein: the baffle plate has a first opening in an upper portion thereof, and a second opening in a lower portion thereof.

26. The tank of claim 25 including: tubular means located in the chamber for receiving liquid and discharging liquid into the tank chamber, said tubular means having a portion thereof extended through the second opening in the baffle plate.

27. The tank of claim 14 wherein: the front wall has a height greater than two times the height of the rear wall.

28. The tank of claim 14 wherein: the top wall has a downwardly extended peripheral flange engageable with upper portions of the front wall, rear wall, and end walls of the body, and means securing the flange to said upper portions.

29. The tank of claim 28 wherein: the flange overlaps said upper portions of the front, rear, and end walls of the body.

30. The tank of claim 14 including: sight gauge means mounted on the bottom wall and top wall for monitoring the level of liquid in the tank chamber.

31. The tank of claim 30 wherein: the sight gauge means includes an upright tubular member.

32. The tank of claim 14 including: means joined to the bottom wall adapted to be connected to a mounting bracket.

33. The tank of claim 32 wherein: the means joined to the bottom wall includes first flange means located adjacent the rear transverse portion of the bottom wall, and second flange means located adjacent the front transverse portion of the bottom wall.

34. The tank of claim 32 wherein: the means joined to the bottom wall includes first flange means located adjacent a rear transverse portion of the bottom wall in general vertical alignment with the rear wall, and second flange means located adjacent a front transverse portion of the bottom wall in general vertical alignment with the front wall.

35. A tank having a chamber for storing liquid comprising: a body having a bottom wall, a front wall, a rear wall, and end walls providing a chamber for storing liquid, a top wall joined to the front wall, rear wall, and end walls to cover the top of the body and enclose the chamber, said top wall sloping downwardly from the front wall toward the rear wall, first means providing an inlet passage open to the chamber, second means providing an outlet passage open to the chamber, and means mounted on the body for receiving liquid and discharging liquid into the tank chamber, said means including tubular means located in the chamber for carrying liquid toward the end walls and discharging liquid into the opposite end sections of the chamber.

36. The tank of claim 35 wherein: the bottom wall has a downwardly directed central well and baffle means located in said chamber on opposite sides of said well, said baffle means having lower openings, said tubular means having portions extended through said lower openings in the baffle means.

37. The tank of claim 35 wherein: the front wall has a height greater than the height of the rear wall.

38. The tank of claim 35 including: means joined to the bottom wall adapted to be connected to a mounting bracket, said means joined to the bottom wall including first flange means located adjacent a rear transverse portion of the bottom wall and second flange means located adjacent a front transverse portion of the bottom wall.

39. The tank of claim 38 wherein: the first flange means is located in general vertical alignment with the rear wall and the second flange means is located in general vertical alignment with the front wall.

40. A tank mountable on a rear drive unit of a tractor with a mounting bracket, said drive unit having rear drive wheels comprising: a one-piece body of plastic material reinforced with fibers having a chamber for storing liquid, said body comprising a bottom wall having a front transverse portion, a rear transverse portion, and a plurality of first ribs projected upwardly into the chamber, each first rib extended from the front portion to the rear portion of the bottom wall, each first rib having a bead of foamed plastic covered with plastic material, a front wall joined to the front transverse portion, a rear wall joined to the rear transverse portion, said front wall having a height greater than the height of the rear wall, side walls joined to the bottom wall and front and rear walls, a top joined to the front wall, rear wall, and side walls to cover the top of the body and close the top of the chamber, said top wall being generally flat and sloping downwardly and rearwardly from the front wall toward the rear wall, said top wall being made of plastic material reinforced with fibers and having a plurality of laterally spaced second ribs projected downwardly into the chamber, each second rib extended from the front wall to the rear wall, each second rib having a bead of foamed plastic covered with plastic material, a plurality of upright baffle plates located in the chamber, each plate extended from the front wall to the rear wall and engageable with the bottom wall and top wall, means mounted on the top wall providing an inlet passage into the chamber, said bottom wall and rear wall having central sections providing a downwardly directed well, and second means mounted on the bottom wall providing an outlet passage into the lower portion of the well open to the chamber.

41. The tank of claim 40 wherein: the front wall has a height greater than two times the height of the rear wall.

42. The tank of claim 40 including: means mounted on the body for receiving liquid and discharging the liquid into the tank chamber.

43. The tank of claim 42 wherein: said means mounted on the body includes tubular means located in the chamber for carrying liquid toward the end walls and discharging liquid into the end sections of the chamber.

44. The tank of claim 42 including: means joined to the bottom wall adapted to be connected to the mounting bracket to support the tank on the rear drive unit of the tractor above the rear drive wheels.

45. The tank of claim 44 wherein: the means joined to the bottom wall include first flange means located adjacent the rear transverse portion of the bottom wall, and second flange means located adjacent a front transverse portion of the bottom wall.

46. The tank of claim 45 wherein: the first flange means is located in general vertical alignment with the rear wall, and said second flange means is located in general vertical alignment with the front wall.

47. The tank of claim 40 wherein: each baffle plate has an opening in the lower portion thereof, and tubular means mounted on the body for receiving liquid and discharging the liquid into the tank, said tubular means having separate portions extended to the openings in the baffle plate.

48. The tank of claim 40 wherein: the top wall has a plastic outer layer, and a plastic inner layer, each second rib having a foamed plastic bead located between the inner and outer layers.

* * * * *